US005144336A

United States Patent [19]

Yeung

[11] Patent Number: 5,144,336

[45] Date of Patent: Sep. 1, 1992

[54] METHOD AND APPARATUS FOR CONTROLLING THE TEMPERATURE OF THERMAL INK JET AND THERMAL PRINTHEADS THAT HAVE A HEATING MATRIX SYSTEM

[75] Inventor: King-Wah W. Yeung, Cupertino, Calif.

[73] Assignee: Hewlett-Packard Company, Palo Alto, Calif.

[21] Appl. No.: 778,029

[22] Filed: Oct. 17, 1991

Related U.S. Application Data

[63] Continuation-in-part of Ser. No. 468,493, Jan. 23, 1990, abandoned.

[51] Int. Cl.[5] .................... G01D 15/00; H04N 1/032; H04N 1/034; B41J 2/35

[52] U.S. Cl. .......................... 346/76 PH; 346/140 R; 400/120; 400/126; 400/121; 340/825.52; 340/825.79; 340/825.81; 340/825.82

[58] Field of Search ............ 346/1.1, 76 PH, 140 PD; 400/120, 126, 121; 340/825.52, 825.53, 825.79, 825.81, 825.82

[56] References Cited

U.S. PATENT DOCUMENTS 3,938,136 2/1976 Kawakami .
4,032,925 6/1977 Kos .
4,313,684 2/1982 Tazaki et al. .
4,490,728 12/1984 Vaught et al. .

*Primary Examiner*—Benjamin R. Fuller
*Assistant Examiner*—Huan Tran

[57] ABSTRACT

This disclosure presents methods for controlling the temperature of a thermal ink jet and thermal printhead so that the quality of black and white printing, gray-scale printing, and color printing is improved. The methods control the average residual power of the columns of resistors so that the average residual power of an addressed column has a prescribed relationship to the average residual powder of an unaddressed column. This is achieved by altering the magnitude of the drive voltage that drive the unaddressed resistors of the printhead matrix or by using nonprinting pulses. Methods for measuring the efficiency of the printhead are also presented.

15 Claims, 5 Drawing Sheets

METHOD AND APPARATUS FOR CONTROLLING THE TEMPERATURE OF THERMAL INK JET AND THERMAL PRINTHEADS THAT HAVE A HEATING MATRIX SYSTEM

This application is a continuation-in-part of application Ser. No. 07/468,493, filed Jan. 23, 1990, now abandoned.

FIELD OF THE INVENTION

This invention relates to controlling the temperature of thermal ink jet and thermal printheads that have a matrix of resistors.

BACKGROUND OF THE INVENTION

Thermal ink jet printers are well known in the art and are described by W. J. Lloyd and H. T. Taub in "Ink Jet Devices," Chapter 13 of *Output Hardcopy Devices*, (Ed. R. C. Durbeck and S. Sherr, San Diego: Academic Press, 1988), and in U.S. Pat. Nos. 4,490,728 and 4,313,684. The thermal ink jet printhead has an array of precisely formed nozzles, each having a chamber that receives ink from an ink reservoir. Each chamber has a thin-film resistor, known as a thermal ink jet resistor, located opposite the nozzle so ink can collect between the nozzle and the thermal ink jet resistor. When electric printing pulses heat the thermal ink jet resistor, a small portion of the ink abutting the thermal ink jet resistor vaporizes and ejects a drop of ink from the printhead. The ejected drops collect on a print medium to form printed characters and images.

Uncontrolled printhead temperature fluctuations have prevented the realization of the full potential of thermal ink jet printheads. These fluctuations produce variations in the size of the ejected drops and this results in degraded print qualtiy. The size of ejected drops varies with printhead temperature because two properties that control the size of the drops (i.e., the viscosity of the ink and the amount of ink vaporized by an addressed resistor) vary with printhead temperature. Printhead temperature fluctuations commonly occur during printer startup, during changes in ambient temperature, and when the printer output varies. For example, temperature fluctuations occur when the printer output changes from normal print to "black-out" print (i.e., where the printer covers the page with ink dots).

When printing text in black and white, the darkness of the print varies with printhead temperature because the darkness depends on the size of the ejected drops. When printing gray-scale images, the shade of gray printed depends on the number of dots in a super pixel and the size of those dots. A super pixel has the ability to hold anywhere from zero dots to a maximum number of dots such as sixteen. One dot in the super pixel produces the lightest shade of gray and the darkest shade of gray occurs when dots cover the super pixel. (For more information on super pixels in thermal ink jet printers see page 350–352 of *Output Hardcopy Devices*, ed. R. C. Durbeck and S. Sherr, San Diego: Academic Press, 1988). Ideally, the super pixel becomes covered with ink only when it contains the maximum number of dots. When the uncontrolled printhead temperature gets too high, it produces excessively large dots which have the effect of compressing the range of gray-scale tones. The large dots compress the darker end of the gray-scale range by using fewer than the maximum number of drops to cover the super pixel. Once ink has covered the super pixel, additional drops do not make its tone much darker. The large dots eliminate the lightest tones in the gray-scale range by covering a larger portion of the super pixel and thereby eliminate those gray-scale tones that result from less coverage. Additionally, large dots produced by uncontrolled temperatures result in a non-continuous gray-scale range because the tone of a blank page, which has the maximum light reflection, is much lighter than the lightest shade of gray. Therefore, the temperature of the printhead must be controlled to obtain a large and continuous range of gray-scale tones.

When printing color images, the printed color varies with printhead temperature because the printed color depends on the sizes of all the primary color drops that create the printed color. If the printhead temperature varies from one primary color nozzle to another, the size of drops ejected from one primary color nozzle will differ from the size of drops ejected from another primary color nozzle. So, the resulting printed color will differ from the intended color. If all the nozzles of the printhead have the same temperature but the printhead temperature increases or decreases as it prints the page, the colors at the top of the page will differ from the colors at the bottom of the page. To print text, graphics, or images of the highest quality, the printhead temperature must remain constant.

Thermal printers are well known in the art. In thermal printers, the heat travels directly to the ribbon or the thermal paper instead of being carried away by an ejected drop. The printheads have an array of heating elements that either heat thermal paper to produce a dot on the thermal paper or heat a ribbon (which can have bands of primary color inks as well as black ink) to transfer a dot to the page. In either case, fluctuations in the printhead temperature produce fluctuations in the size of the printed dot that affects the darkness of the print when printing in black and white, the gray-tone when printing in gray scale, and the resulting printed color when printing in color. The discussion below relating to thermal ink jet printers applies to thermal printers.

SUMMARY OF THE INVENTION

For the reasons previously discussed, it would be advantageous to have a method and apparatus for controlling the temperature of thermal ink jet printheads. The present invention is a method and apparatus for controlling in real time (i.e., during the print cycle of the printer) the temperature of a thermal ink jet printhead.

Variations in the average residual power (i.e., the average power delivered to the printhead in one printing interval minus the average power transferred from the printhead to ejected drop(s) in one printing interval) strongly influence the printhead temperature. If the average residual power remains at a constant level, then (after an initial warm-up transient) the printhead temperature remains nearly constant. The invention includes a matrix system with compensation drivers and a matrix system with a nonprinting pulse cycle. Both systems maintain the printhead at a constant temperature by compensating for variations in the average residual power.

A matrix system with compensation drivers adjusts the drive voltages of the unaddressed rows and columns according to the power transferred from the printhead to an ejected drop so the average residual power of the printhead is constant or changes in a prescribed manner.

Generally, the invention compares the average residual power of an addressed column with that of an unaddressed column and adjusts the voltages produced by the matrix drivers until the average residual power of an addressed column equals the average residual power of an unaddressed column. This invention includes the elements of a printhead having a known efficiency (i.e., the precentage of energy applied to an addressed resistor that transfers to an ejected drop); a matrix of n rows and m columns of resistors on the printhead, having an addressed row that can have one or more addressed resistor (i.e., a resistor driven with sufficient power to vaporize the surrounding ink and propel an ink drop from the printhead), an unaddressed row that does not have an addressed resistor, an addressed column that has an addressed resistor, an unaddressed column that does not have an addressed resistor; an addressed row driver that drives the addressed row with $V_D+V_{Ref}$, an addressed column driver that drives the addressed column with a reference voltage, $V_{Ref}$, and a means for driving the unaddressed row and the unaddressed column with voltages having a magnitude that causes the addressed column and the unaddressed column to dissipate the same amount of average residual power so that the temperature of the printhead is constant or changes in a prescribed manner with a change in the number of addressed resistors.

The matrix system with a nonprinting pulse cycle adjusts the power nonprinting pulses deliver to the printhead according to $\overline{P}_{trans}$, the average power transferred from an addressed resistor to an ejected drop, and $\overline{P}_{extra}$, the average of the extra power delivered to an addressed column over that delivered to an unaddressed column, so the average residual power of the printhead is constant or changes in a prescribed manner with the number of addressed resistors. Generally, the invention compares the average residual power of an addressed column with that of an unaddressed column and adjusts the power delivered by the nonprinting pulses to the addressed columns and the unaddressed columns until the average residual power of these columns are equal. This invention includes the elements of a printhead having a known efficiency (i.e., the percentage of energy applied to an addressed resistor that transfers to an ejected drop); a matrix of n rows and m columns of resistors on the printhead, having an addressed row that can have one or more addressed resistor (i.e., a resistor driven with sufficient power to vaporize the surrounding ink and propel an ink drop from the printhead), an unaddressed row that does not have an addressed resistor, an addressed column that has an addressed resistor, an unaddressed column that does not have an addressed resistor; an addressed row driver that drives the addressed row with $V_D+V_{Ref}$, an addressed column driver that drives the addressed column with a reference voltage, $V_{Ref}$; an unaddressed row driver that drives the unaddressed rows with $AV_D+V_{Ref}$ where A has an assigned value; an unaddressed column driver that drives the unaddressed columns with $BV_D+V_{Ref}$ where B has an assigned value; the addressed columns and the unaddressed columns have an assigned mandatory average residual power; and a means for driving the resistors in the addressed columns and the unaddressed columns with a plurality of nonprinting pulses having enough energy to cause the addressed columns and the unaddressed columns to dissipate their mandatory average residual power so that the average residual power and temperature of the printhead remains constant or varies in a prescribed manner with the number of addressed resistors.

Both the matrix system with compensation drivers and the matrix system with a nonprinting pulse cycle use the efficiency of the printhead (i.e., the percentage of energy applied to an addressed resistor that transfers to the ejected drop) in their calculations. The present invention includes a method for determining this efficiency, $\eta$.

DETAILED DESCRIPTION OF THE INVENTION

Person skilled in the art will readily appreciate the advantages and features of the disclosed invention after reading the following detailed description in conjunction with the drawings, the parts number list, and the symbol table.

Figure 1:
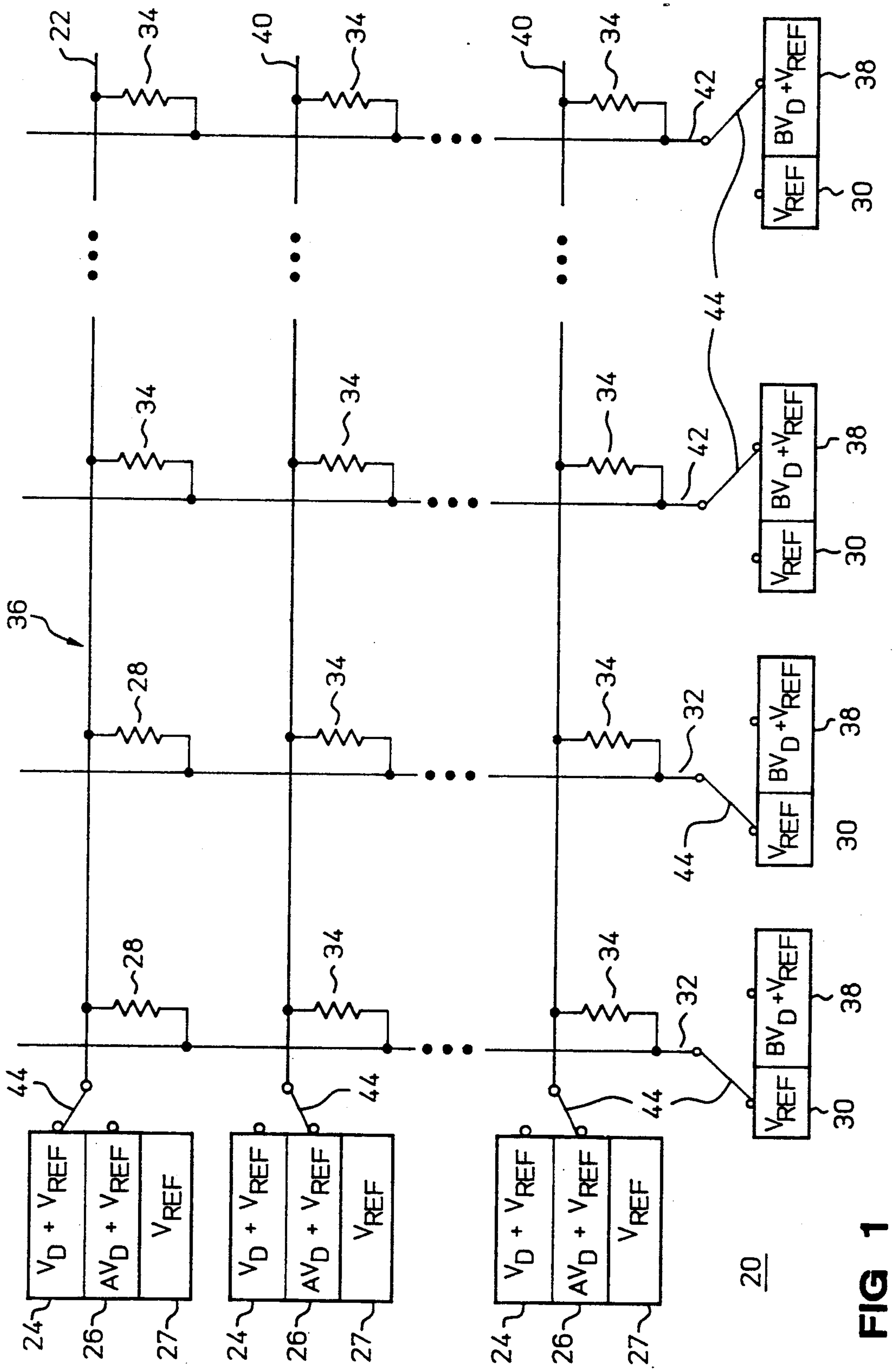
FIG. 1 shows the matrix system with compensation drivers that controls the printhead temperature by adjusting the voltages that drive the matrix of resistors so the average residual power produced by an addressed column equals the average residual power produced by an unaddressed column.

FIG. 1 shows an apparatus that implements the preferred embodiment of the matrix system with compensation drivers for the unaddressed rows and columns. The addressed row drivers 24 and the unaddressed row drivers 26 drive rows of resistors 22, 40 (each resistor having a resistance R). A row driven by addressed row driver 24 is an addressed row 22 and has a voltage $V_D+V_{Ref}$ applied to it. Those rows driven by unaddressed row driver 26 are unaddressed rows 40 and have a voltage $AV_D+V_{Ref}$ applied to them. The row drivers 24, 26, 27 produce voltages having a $V_{Ref}$ component for mathematical simplicity. All voltages applied by the column drivers (whether addressed or unaddressed) have a $V_{Ref}$ component that cancels the $V_{Ref}$ component produced by row drivers 24, 26, 27. (The reference voltage, $V_{Ref}$, can have any value.)

Likewise, the addressed column drivers 30 and the unaddressed column drivers 38 drive the columns of resistors 32, 42. A column driven by addressed column driver 30 contains an addressed resistor (i.e., a resistor driven with sufficient power to vaporize the surrounding ink and propel an ink drop from the printhead). This column is an addressed column 32 and has a voltage $V_{Ref}$ applied to it. The columns driven by the unaddressed column driver 38 are unaddressed columns 42 and have a voltage $BV_D+V_{Ref}$ applied to them.

Figure 5:
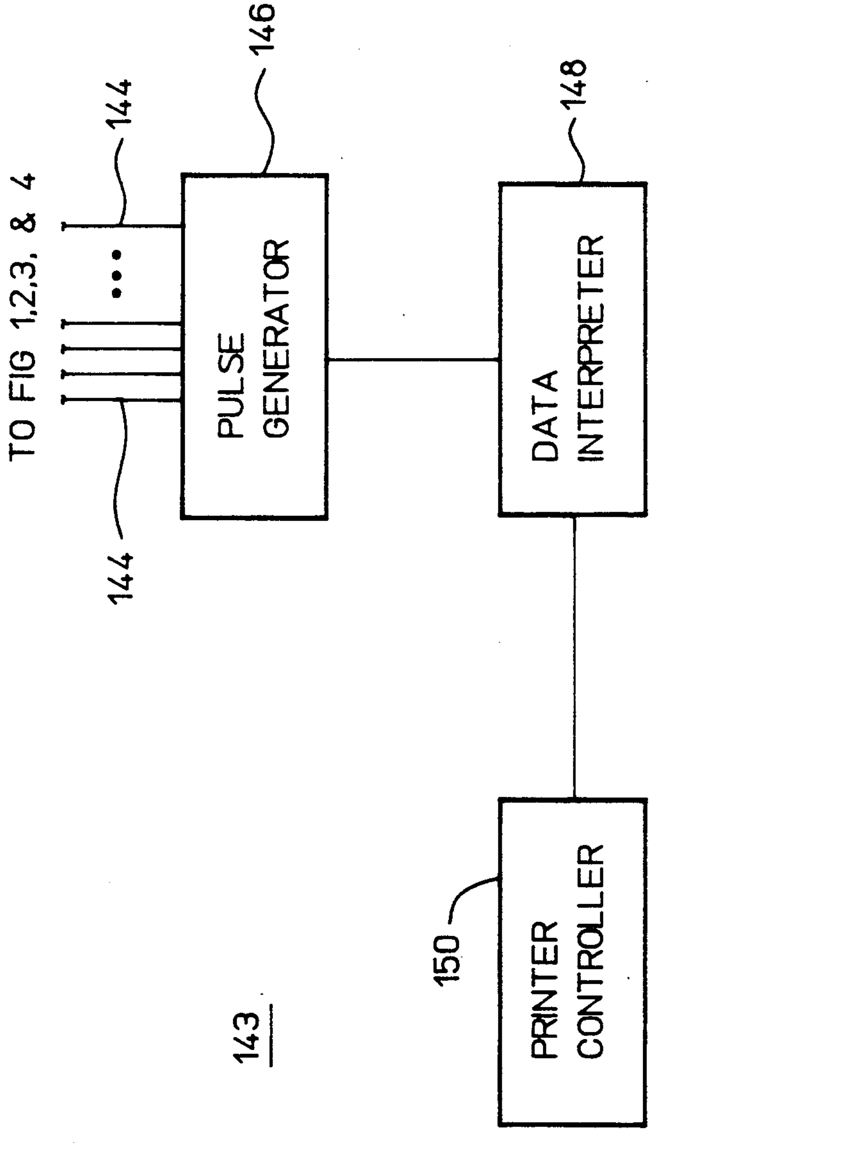
FIG. 5 shows the control system for the matrix systems shown in FIGS. 1 through 4.

FIG. 5 shows the matrix control system 143 that controls the switches 44 shown in FIG. 1. These switches connect row drivers 24, 26, 27 and column drivers 30, 38 to matrix 36. When the printer controller 150 sends a print command to the data interpreter 148, data interpreter responds by commanding the pulse generator 146 to send a set of signals to switches 44. The switches respond by connecting specific drivers 24, 26, 27, 30, 38 to specific rows and columns so matrix control system 143 drives addressed resistors 28 and unaddressed resistors 34 with the proper voltages.

In the preferred embodiment of the invention, matrix control system 143 sequentially connects (through switches 44) each row to row driver 24. If this addressed row 22 has addressed resistor 28, then matrix control system 143 will cause (through switches 44) addressed column driver 30 to drive the column containing addressed resistor 28. Meanwhile, matrix control system 143 commands the remaining switches to connect their rows and columns to unaddressed row drivers 26 and unaddressed column drivers 38, respectively. Addressed row driver 24 and addressed column driver 30 drive addressed resistors 28 with printing pulses having a magnitude of $V_D$ for the drop ejection cycle, $t_{dec}$, that typically equals 3 μsec. Nonprinting pulses have a smaller magnitude voltage for the drop ejection cycle, $t_{dec}$, and they drive the unaddressed resistors 34. After the drop ejection cycle ($t_{dec}$) has elapsed, matrix control system 143 instructs switches 44 to connect all rows to the reference voltage driver 27 and to connect all columns to addressed column driver 30 so that the voltage across each resistor in the matrix equals zero volts. Then, matrix control system repeats this process for every row in matrix 36 during the printing interval, $t_z$, which typically has duration of approximately 200 μsec.

Variations in the average residual power of the printhead (i.e., the average power delivered to the printhead in one printing interval minus the average power transferred from the printhead to ejected drop(s) in one printing interval) strongly influence the printhead temperature. If the average residual power remains at a constant level, then (after an initial warm-up transient) the printhead temperature remains nearly constant. The present invention maintains the printhead at a constant temperature by maintaining the average residual power of the printhead at a constant level.

The system shown in FIG. 1 has several contributors to the average residual power. One of them is the number of addressed resistors 28 and unaddressed resistors 34 (i.e., resistors that do not eject drops because the matrix drives them with insufficient energy). There may be as many as an entire row of addressed resistors 28 or as few as zero addressed resistors 28. The power delivered to each addressed resistor 28 equals $(V_D+V_{Ref}-V_{Ref})^2/R=V_D^2/R$. Some of this power leaves with the ejected drop, the remainder becomes part of the average residual power of the printhead. The amount of energy remaining with the printhead depends on the efficiency of the printhead, $\eta$, (i.e., the percentage of energy applied to addressed resistor 28 that transfers to the ejected drop). Usually, $\eta$ is less than 100%. For example, if the printhead has an efficiency, $\eta$, of 60%, then 60% of $V_D^2/R$ leaves with the drop and the remaining power becomes part of the residual power of the printhead.

Another variable contributor to the residual power is the amount of power dissipated by unaddressed resistors 34. This depends on their location within matrix 36. Those unaddressed resistors driven by addressed row driver 24 and unaddressed column driver 38 dissipate power equal to $(V_D-BV_D)^2/R$. Those unaddressed resistors driven by unaddressed row driver 26 and addressed column driver 30 dissipate power equal to $(AV_D)^2/R$. And those unaddressed resistors driven by unaddressed row driver 26 and unaddressed column driver 38 dissipate power equal to $(BV_D-AV_D)^2/R$. The preferred embodiment evaluates these variable contributors to the average residual power when deriving values of A and B.

Generally, the preferred embodiment of the invention compares the average residual power of the addressed column and the unaddressed column and then adjusts A and B until these columns have the same average residual power. Specifically, the preferred embodiment calculates $\bar{P}_{extra}$, the difference between $\bar{P}_{ac}$, the average amount of power delivered to one addressed column of resistors in one printing interval, and $\bar{P}_{uc}$, the average amount of power delivered to one unaddressed column of resistors in one printing interval. Then the preferred embodiment sets $\bar{P}_{extra}$ equal to $\bar{P}_{trans}$, the average amount of power transferred in one printing interval from the addressed resistor to the ejected drop. Next, the preferred embodiment selects a value of A (or B) and then derives a value B (or A) from the equation $\bar{P}_{extra}=\bar{P}_{trans}$ using iterative techniques. The invention uses these values of A and B in unaddressed row driver 26 and unaddressed column driver 38 provided the resulting parasitic voltages across the unaddressed resistors will not cause those unaddressed resistors to dissipate enough energy to eject a drop.

Although addressed row drivers 24, unaddressed row drivers 26, addressed column drivers 30, and unaddressed column drivers 38 drive their respective rows 22, 40 and columns 32, 42 with typically 3 μsec pulses, the printhead has a long thermal time constant and reaches its thermal equilibrium temperature only after many printing intervals (which are typically 200 μsec long) have passed. The preferred embodiment of the invention averages the various powers over a window of one printing interval and alternate embodiments of the invention include averaging the various powers over more than one printing interval.

As stated earlier, matrix control system 143 sequentially addresses all rows in a single printing interval, $t_z$ and repeats the process in the following printing interval. To simplify the mathematics, the following discussion assumes that the matrix system controller 143 only addresses one row per printing interval.

If all rows in a matrix of resistors have the same pattern of addressed and unaddressed resistors, the various average powers in the following equations can be multiplied by the number of rows to create equations that apply to those matrices.

Although the following equations have been derived for a matrix system that addresses only one row per printing interval, the values of A and B obtained to make the average residual power of the addressed columns and the unaddressed columns equal apply to matrices that address multiple rows during each printing interval even when the multiple rows have different patterns of addressed and unaddressed resistors.

Assume the matrix has n rows and m columns and that matrix control system 143 only addresses one row each printing interval, $t_z$. The average power delivered to an addressed column in one printing interval, $t_z$, equals the total energy delivered to that column in one printing interval divided by the length of that interval, $t_z$. The mathematical expression is:

$$\overline{P}_{ac} = \frac{1}{t_z}\int_{t_0}^{t_0 + t_{dec}} P_{ac}dt$$

where $P_{ac}$ equals the instantaneous power delivered to an addressed column, $t_o$ marks the beginning of the pulses produced by row and column drivers, and $t_{dec}$ equals the duration of the pulses produced by the row and column drivers. $P_{ac}$ equals the instantaneous power delivered to one addressed resistor plue the instantaneous power delivered to (n−1) unaddressed resistors. The mathematical expression is $P_{ac}=V_D^2/R+(n-1)A^2V_D^2/R$. So that the average power delivered to an addressed column equals:

$$\overline{P}_{ac} = \frac{1}{t_z}\int_{t_0}^{t_0 + t_{dec}} P_{ac}dt = \frac{1}{t_z}\int_{t_0}^{t_0 + t_{dec}} \frac{[1 + (n-1)A^2]V_D^2}{R}\,dt.$$

Similarly, the average power delivered to an unaddressed column in one printing interval, $t_z$, equals the total energy delivered to that column in one printing interval divided by the length of that interval, $t_z$. The mathematical expression is:

$$\overline{P}_{uc} = \frac{1}{t_z}\int_{t_0}^{t_0 + t_{dec}} P_{uc}dt$$

where $P_{uc}$, is the instantaneous power delivered to one unaddressed column. $P_{uc}$ equals the instantaneous power delivered to one unaddressed resistor 34 in addressed row 22 plus the instantaneous power delivered to (n−1) unaddressed resistors 34 located in unaddressed rows 40.

The mathematical expression is $P_{uc}=(1=B)^2V_D^2/R+(n-1)(B-A)^2V_D^2/R$.

Thus, the average power delivered to one unaddressed column 42 equals:

$$\overline{P}_{uc} = \frac{1}{t_z}\int_{t_0}^{t_0 + t_{dec}} P_{uc}dt = \frac{1}{t_z}\int_{t_0}^{t_0 + t_{dec}} \frac{[(1-B)^2 + (n-1)(B-A)^2]V_D^2}{R}\,dt.$$

$\overline{P}_{extra}$ equals $\overline{P}_{ac}-\overline{P}_{uc}$ and the mathematical expression is:

$$\frac{1}{t_z}\int_{t_0}^{t_0 + t_{dec}} [1 + (n-1)A^2]V_D^2 - \frac{[(1-B)^2 + (n-1)(B-A)^2]V_D^2}{R}\,dt.$$

$\overline{P}_{trans}$, the average power transferred during one printing interval from an addressed resistor to an ejected drop equals $$\frac{\eta}{t_z}\int_{t_0}^{t_0 + t_{dec}} \frac{V_D^2}{R}\,dt$$

where $\eta$ is the efficiency of the printhead and $t_z$ is the length of one printing interval. The efficiency can be determined by one of several methods that will be described later. If $V_D$ is constant, the length of the drop ejection cycle, $t_{dec}$, is constant, and the length of the printing interval, $t_z$, is constant; then the instantaneous power is proportional to the average power.

To maintain a constant printhead temperature as the printer output varies, the average residual power of each column must remain constant whether addressed or unaddressed. This occurs when all the extra power delivered to an addressed column equals the power ejected with a drop, i.e., $\overline{P}_{extra}$ equals $\overline{P}_{trans}$. Mathematically:

$$P_{trans} = P_{extra}$$

$$\eta\int_{t_0}^{t_0 + t_{dec}} \frac{V_D^2}{R}\,dt = \int_{t_0}^{t_0 + t_{dec}} \frac{[1 + (n-1)A^2]V_D^2 - [(1-B)^2 + (n-1)(B-A)^2]V_D^2}{R}\,dt.$$

This equation can be further simplified as:

$$\eta=[1+(n-1)A^2]-[(1-B)^2+(n-1)(B-A)^2]$$

$$\eta=B[2-Bn+2A(n-1)].$$

Since the values of n and $\eta$ are known, this equation is solved by choosing a value for A (or B) and solving the equation for B (or A) using iterative techniques. The invention uses these values of A and B in unaddressed row driver 26 and unaddressed column driver 38, respectively, provided the resulting parasitic voltages across the unaddressed resistors will not cause those unaddressed resistors to dissipate enough power to eject a drop. In the preferred embodiment, the voltages across the unaddressed resistors do not exceed $\frac{1}{2}V_D$ so the power dissipated by each unaddressed resistor 34 does not exceed $\frac{1}{4}V_D^2/R$. (In other embodiments, the upper limit of the ration between the voltages across the unaddressed and addressed resistors can be other than $\frac{1}{2}$.) As discussed earlier, the amount of power dissipated by an unaddressed resistor depends on its location within the matrix and can be either $(1-B)^2V_D^2/R$, $A^2V_D^2/R$, or $(B-A)^2V_D^2/R$. Therefore, in the preferred embodiment, the values of (1−B), A, and (B−A) must be equal to or less than $\frac{1}{2}$.

For the printhead temperature to increase or decrease with an increase in the number of addressed resistors, $\overline{P}_{extra}$ equals $\overline{P}_{trans}\pm P_k$, where $P_k$ equals $KV_D^2/R$ and K equals a constant. The equation describing the efficiency becomes $\eta\pm k=B[2-Bn+2A(n-1)]$. A and B are calculated in the same manner as A and B when the printhead temperature remains constant.

Figure 2:
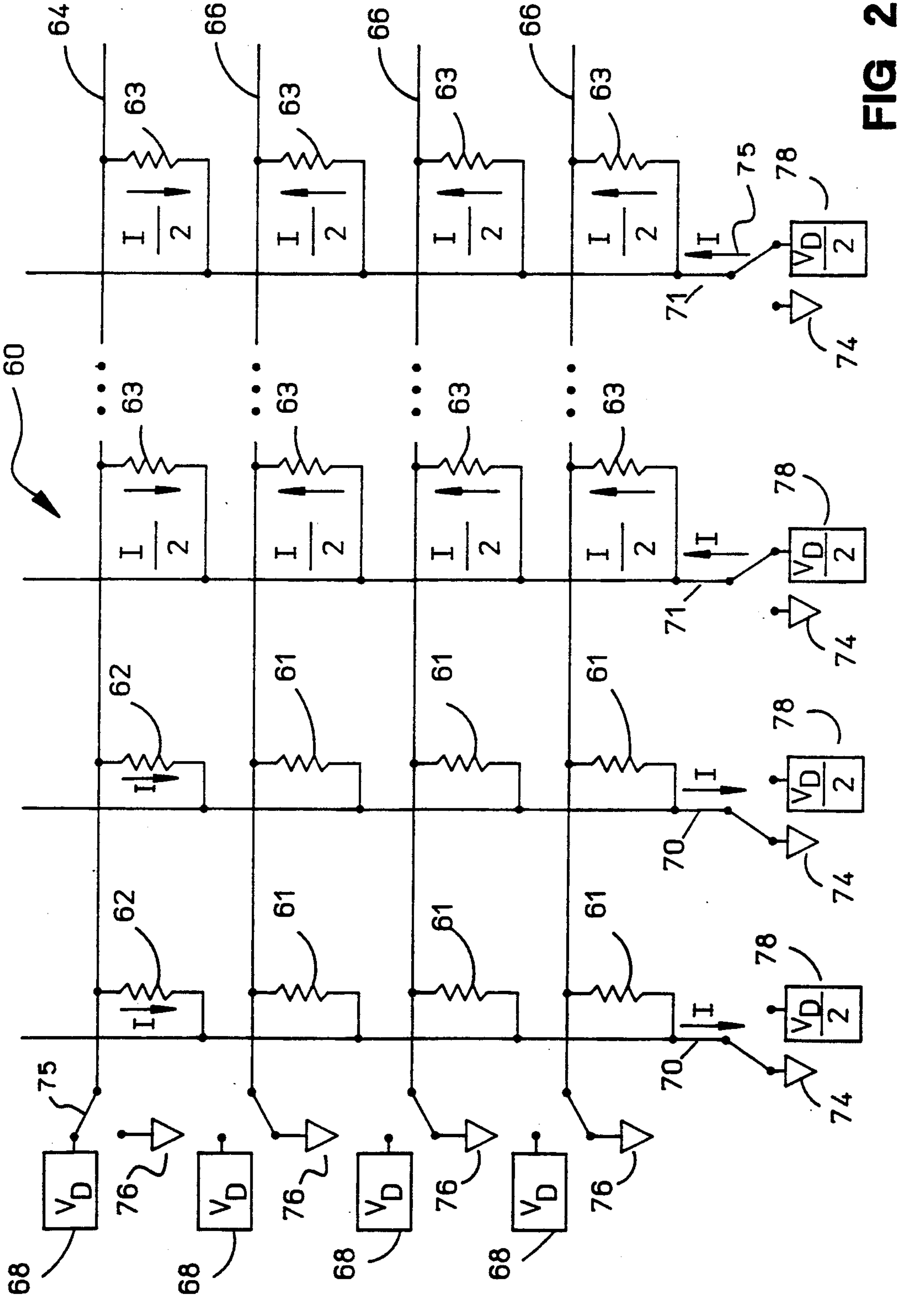
FIG. 2 shows a specific embodiment of the matrix system with compensation drivers for use with low-efficiency printheads.

FIG. 2 shows a specific embodiment of the matrix system having compensation drivers for low efficiency printheads. Low efficiency printheads transfer very little of their energy to the ejected drops and most of the energy dissipated by the addressed heating elements becomes part of the average residual power of the printhead and affects the temperature of the printhead. In FIG. 2, the addressed columns 70 dissipate the same amount of power as the unaddressed columns 72. The addressed row drivers 68 and the addressed column drivers 74 drive the addressed resistors 62 and cause each of them to dissipate a power of $V_D^2/R$. The unaddressed row drivers 76 and the addressed column driver 74 drive the unaddressed resistors 61 located in addressed columns 70 and these resistors do not dissipate any power. Therefore, addressed columns 70 dissipate power having a magnitude $V_D^2/R$.

The unaddressed column driver 78 and either addressed row driver 68 or unaddressed row driver 76 drive the unaddressed resistors 63. In either case, each unaddressed resistor dissipates a power of $\frac{1}{4}$ $V_D^2/R$ and each unaddressed column 72 dissipates a power of $V_D^2/R$ which equals the power dissipated by the addressed columns. When the printhead has a very low efficiency, nearly all the power dissipated by addressed resistors 62 becomes part of the residual power of the printhead. Therefore, the addressed columns and the unaddressed columns have the same average residual power so the printhead has a constant temperature regardless of the number of addressed resistors.

Figure 3:
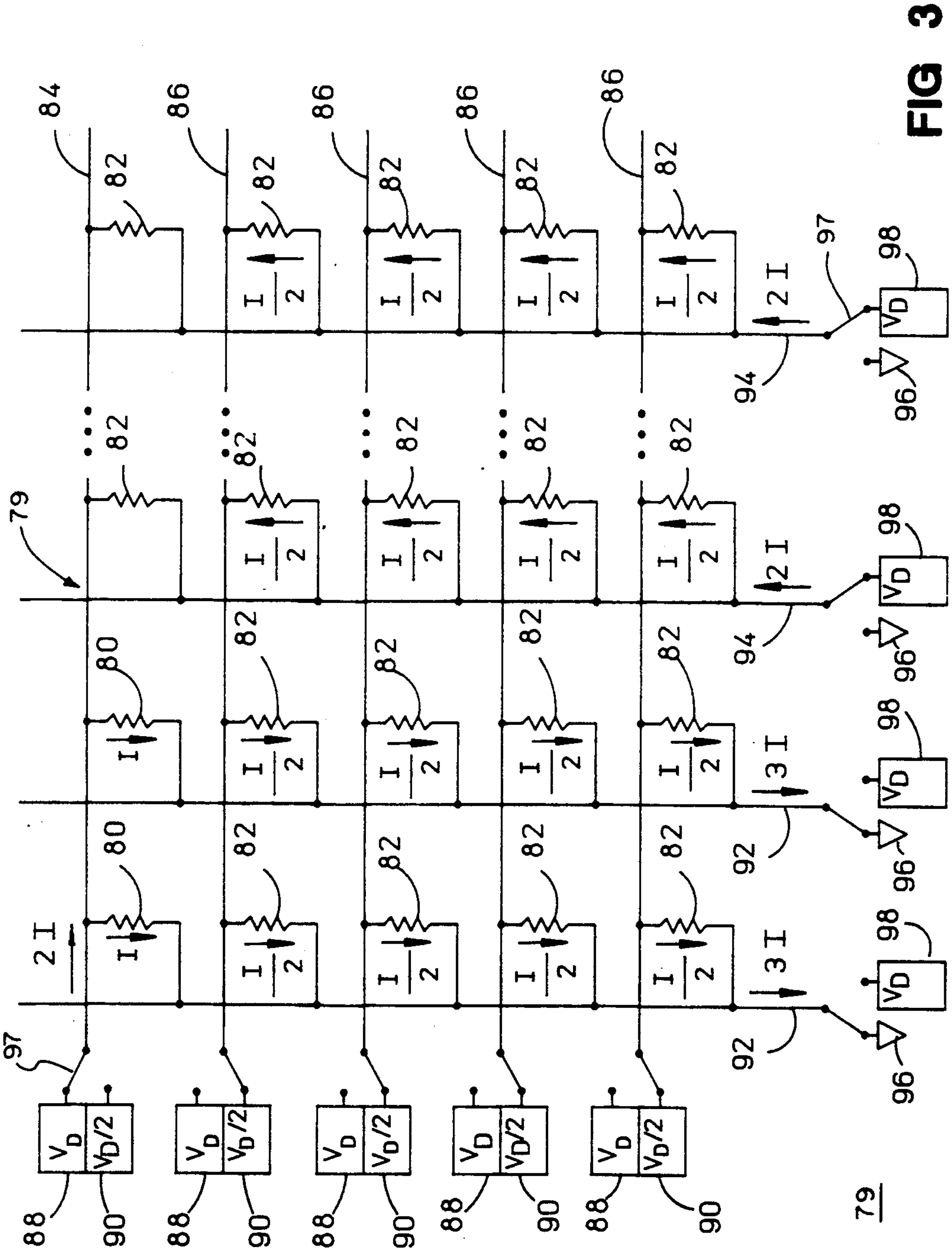
FIG. 3 shows a specific embodiment of the matrix system with compensation drivers for use with high-efficiency printheads.

FIG. 3 shows a specific embodiment of the matrix system with compensation drivers for high-efficiency printheads. The total power dissipated by all the unaddressed resistors 82 remains constant regardless of the number of addressed resistors 80. The addressed row driver 88 and the unaddressed column driver 98 drive the unaddressed resistors 82 located in the addressed row 84. These resistors do not dissipate any power at all. The unaddressed rows 86 contain the remaining unaddressed resistors 82 and each one dissipates power having the magnitude $\frac{1}{4}$ $V_D^2/R$. When a printhead has a very high efficiency, nearly all the power dissipated by the addressed resistors transfers to the ejected drops and virtually none of the power dissipated by the addressed resistors becomes part of the residual power of the printhead. Therefore, the total power dissipated by the unaddressed resistors is constant regardless of the number of addressed resistors and equals the total residual power of the printhead and maintains the printhead at a constant temperature.

As stated earlier, the present invention includes a method for measuring the printhead efficiency, $\eta$. The method drives a matrix having at least one addressed column with an unchanging value of A and a changing value of B or vice versa until it finds a value of B that results in the printhead having a constant thermal equilibrium temperature regardless of the number of addressed columns.

Specifically, the method selects values for A and B, drives addressed row 22 in FIG. 1 with addressed row driver 24 that produces a voltage $V_D+V_{Ref}$, drives unaddressed rows 40 with unaddressed row driver 26 that produces a voltage $AV_D+V_{Ref}$, drives one or more addressed columns 32 with addressed column driver 30 that produces a voltage $V_{Ref}$, and drives unaddressed columns 42 with unaddressed column driver 38 that produces a voltage $BV_D+V_{Ref}$. Once the printhead reaches thermal equilibrium, the method measures the first equilibrium temperature with a temperature sensor located on the same substrate as the resistors in the matrix. Next, the method converts one or more addressed columns 32 into unaddressed columns 42 and drives them with the unaddressed column driver 38 that produces a voltage $BV_D+V_{Ref}$. The method drives the matrix in this configuration until it reaches a second thermal equilibrium. Then, the method measures the second equilibrium temperature and compares it with the first equilibrium temperature. If the two temperatures are different, then the method chooses a new value for A or B and repeats the previous steps until the first equilibrium temperature equals the second equilibrium temperature. When this occurs, $\overline{P}_{extra}$, the average amount of extra power delivered to one addressed column 32, equals $\overline{P}_{trans}$, so all the extra power delivered to address column 32 transfers to the ejected drop. The expression, $\overline{P}_{trans}$, describing the energy transferred from addressed resistor 28 to an ejected drop can be set equal to the expression for $\overline{P}_{extra}$. The resulting equation can be solved for the efficiency, $\eta$, and the values of A and B substituted into the equation to calculate the efficiency of the printhead. The invention uses these values of A and B in unaddressed row driver 26 and unaddressed column driver 38, respectively, provided the resulting parasitic voltages across the unaddressed resistors will not cause those unaddressed resistors to dissipate enough power to eject a drop. Mathematically, $$\overline{P}_{trans} = \overline{P}_{extra}$$

$$\overline{P}_{extra} = \overline{P}_{ac} - \overline{P}_{uc}$$

$$\overline{P}_{trans} = \frac{\eta}{t_z}\int_{t_0}^{t_0 + t_{dec}} \frac{V_D^2}{R}\,dt$$

$$\overline{P}_{ac} = \frac{1}{t_z}\int_{t_0}^{t_0 + t_{dec}} P_{ac}dt = \frac{1}{t_z}\int_{t_0}^{t_0 + t_{dec}} \frac{[1 + (n-1)A^2]V_D^2}{R}\,dt$$

$$\overline{P}_{uc} = \frac{1}{t_z}\int_{t_0}^{t_0 + t_{dec}} P_{uc}dt = \frac{1}{t_z}\int_{t_0}^{t_0 + t_{dec}} \frac{[(1-B)^2 + (n-1)(B-A)^2]V_D^2}{R}\,dt$$

$$\eta\frac{V_D^2}{R} = \frac{[1 + (n-1)A^2]V_D^2 - [(1-B)^2 + (n-1)(B-A)^2]V_D^2}{R}$$

$$\eta = B[2 - Bn + 2A(n-1)].$$

The efficiency, $\eta$, can be calculated using any values of A and B that maintain the printhead at a constant temperature regardless of the number of addressed resistors. After the printer has warmed up to its operating temperature, $\overline{P}_{trans}$ can be calculated by multiplying $\eta$ with the average power delivered to one addressed resistor.

Figure 4:
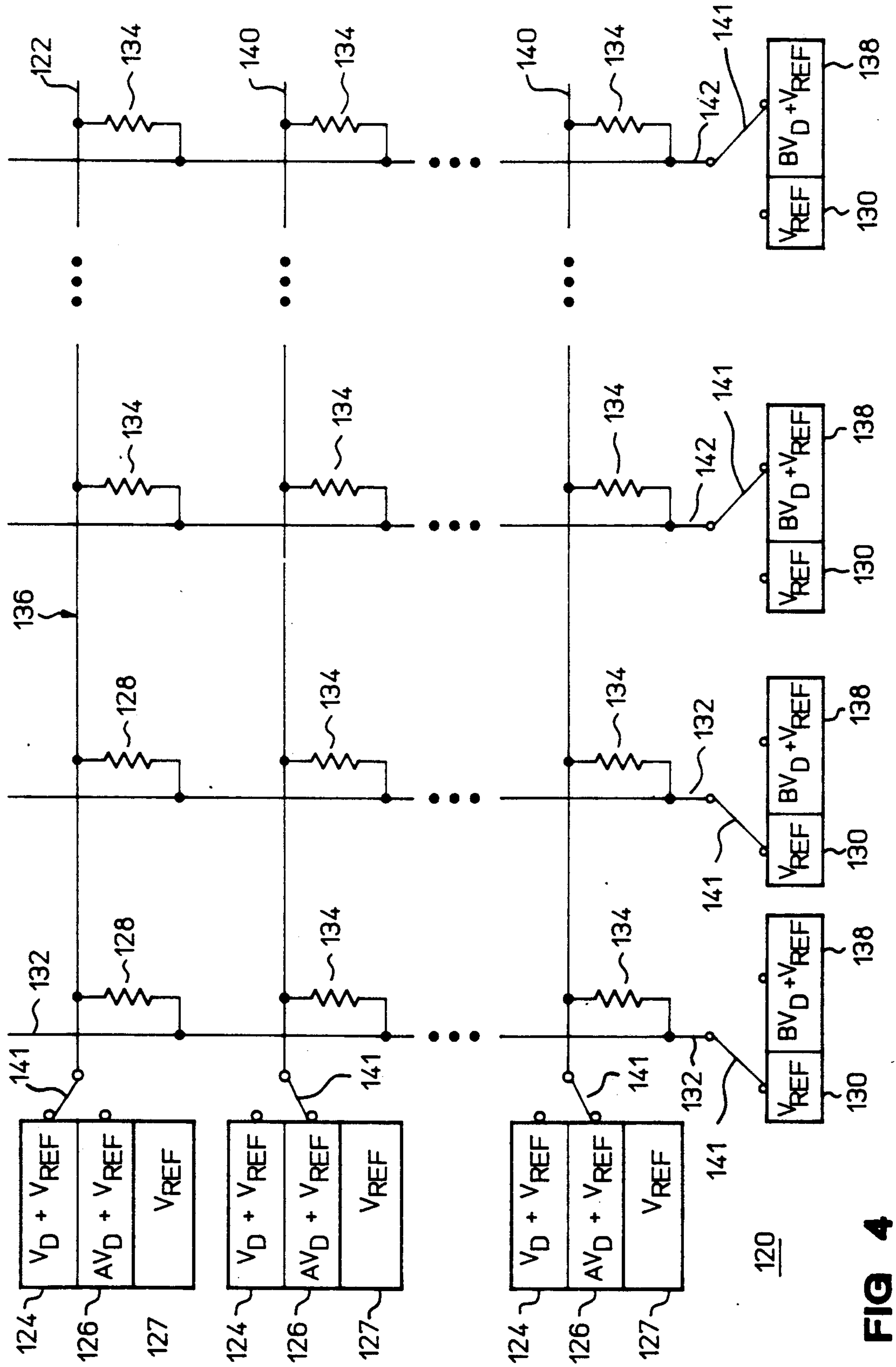
FIG. 4 shows the matrix system with a nonprinting pulse cycle that controls the printhead temperature by driving the printhead with nonprinting pulses and by varying the power delivered by the nonprinting pulses according to $\overline{P}_{trans}$, the average power ejected with a drop, and $\overline{P}_{extra}$, the average of the extra amount of power delivered to one addressed column over the amount of power delivered to one unaddressed column in one printing interval.

An apparatus similar to that shown in FIG. 4 can measure the efficiency, $\eta$, of a printhead. This measurement has the following steps. First, for each addressed resistor 128 participating in this measurement (any number of addressed resistors 128 greater than one may be used), a printer controller 150 shown in FIG. 5 sends print data containing one print command per addressed resistor 128 shown in FIG. 4 per printing interval to the data interpreter 148. Data interpreter 148 responds by commanding the pulse generator 146 to send a set of signals to the switches 141 that causes the switches to connect specific drivers 124, 126, 127, 130, 138 to specific rows and columns to drive the addressed resistors 128 with printing pulses having a known energy and to drive the unaddressed resistors with nonprinting pulses (i.e., low-voltage pulses that cannot produce print because they have insufficient energy) having another known energy. When the printhead reaches "thermal equilibrium" (i.e., the printhead temperature stabilizes), a temperature sensor, located on the same substrate as the resistors, measures the thermal equilibrium temperature. The total amount of energy delivered to the addressed resistors and the unaddressed resistors during one printing interval is the printing mode energy. Second, printer controller 150 in FIG. 5 sends print data that does not have a print command in any printing interval to data interpreter 148. Data interpreter 148 instructs pulse generator 146 to send signals to the switches that causes them to connect specific drivers 124, 126, 127, 130, 138 to specific rows and columns for a specific length of time so that the drivers drive addressed resistors 128 and unaddressed resistors 134, shown in FIG. 4, with nonprinting pulses. Nonprinting pulses can be low voltage and/or small width pulses. Matrix control system 143 adjusts the energy carried by the nonprinting pulses in one printing interval until the printhead temperature stabilizes at the same thermal equilibrium temperature measured in the previous steps. The amount energy transmitted in one printing interval by these nonprinting pulses is the nonprinting mode energy. Third, the nonprinting mode energy is subtracted from the printing mode energy to obtain the amount of energy carried by the ejected drops. Fourth, the efficiency, $\eta$, is the ratio of the energy carried by one ejected drop to the energy of one printing pulse.

FIG. 4 shows the preferred embodiment of the matrix system with a nonprinting pulse cycle 120. It is similar to the matrix system with compensation drivers 20 shown in FIG. 1 in that it calculates the average residual power of the addressed columns and the unaddressed columns and compensates for differences in the average residual power. It is different from the matrix system with compensation drivers 20 in that it does not compensate for these differences by adjusting the magnitude of the voltages driving the unaddressed rows and unaddressed columns. Instead, the printing intervals, $t_z$, contain a nonprinting pulse cycle that typically occurs a few $\mu$ sec after the drop ejection cycle. As described earlier, the drop ejection cycle is when matrix control system 143 of FIG. 5 causes the addressed resistors 128 in FIG. 4 to be driven with the voltage $V_D$ and causes the unaddressed resistors 134 to be driven with a smaller voltage. During the nonprinting pulse cycle, nonprinting pulses transfer a known amount of energy to the selected resistors so that the average residual power of the addressed columns equals or has a prescribed relationship to the average residual power of the unaddressed columns.

Matrix system with a nonprinting pulse cycle 120 has the advantage of compensating for differences in the average residual power of the addressed columns and the unaddressed columns without adjusting the values assigned to A and B. Matrix system with a nonprinting pulse cycle 120 adjusts the average residual power of addressed columns 132 and unaddressed columns 142 during the nonprinting pulse cycle which occurs after the drop ejection cycle.

The difference between the average residual power of the addressed columns and the unaddressed columns is determined by calculating the average residual power of the addressed columns from $\overline{P}_{ac}-\overline{P}_{trans}$, the average residual power of the unaddressed columns from $\overline{P}_{uc}$, and the difference between the residual power of the addressed columns and of the unaddressed columns from $\overline{P}_{ac}-\overline{P}_{trans}-\overline{P}_{uc}=\overline{P}_{extra}-\overline{P}_{trans}$. Matrix system with a nonprinting pulse cycle 120 compensates for this difference in the average residual power by driving resistors in the matrix with nonprinting pulses having enough power to make the average residual power of the addressed columns equal to or have a prescribed relationship to the average residual power of the unaddressed columns.

The parts and the operation of matrix system with a nonprinting pulse cycle 120 shown in FIG. 4 are similar to that of matrix system with compensation drivers 20 shown in FIG. 1. In FIG. 4, a row driver 124 drives the addressed rows 122 and an unaddressed row driver 126 drives the unaddressed rows 140. Addressed row 122 may or may not have an addressed resistor 128. If it has an addressed resistor, then an addressed column driver 130 drives the column containing addressed resistor 128 and it is an addressed column 132. Unaddressed column driver 138 drives the remaining columns and they are unaddressed columns 142.

Like the matrix system with compensation drivers 20 shown in FIG. 1, matrix system with a nonprinting pulse cycle 120 has a matrix control system 143 shown in FIG. 5 that sequentially connects (through switches 141) each row to addressed row driver 124. If this addressed row 122 has addressed resistor 128, then matrix control system 143 will cause (through switches 141) addressed column driver 130 to drive the column containing the addressed resistor 128. Meanwhile, matrix control system 143 commands the remaining switches 141 to connect their rows and columns to unaddressed row drivers 126 and unaddressed column drivers 138, respectively. Addressed row driver 124 and addressed column driver 130 drive addressed resistors 128 with $V_D$ for the drop ejection cycle, $t_{dec}$, which typically equals 3 $\mu$ sec. The various row and column drivers drive unaddressed resistors 134 with a smaller magnitude voltage that will not cause a drop to eject for the drop ejection cycle, $t_{dec}$. When the drop ejection cycle has elapsed, matrix control system 143 instructs switches 141 to connect all rows to the reference voltage driver 127 and all columns to the addressed column driver 130 so the voltage across each resistor in the matrix equals zero. Typically, a few $\mu$ sec later, the nonprinting pulse cycle begins and matrix control system 143 causes the resistors in selected columns to be driven by the unaddressed column driver 138 that produces nonprinting pulses so that the average residual power of the addressed columns and the unaddressed columns are equal.

In the preferred embodiment of the matrix system with a nonprinting pulse cycle 120, each column has a mandatory average residual power and the matrix system drives the columns with nonprinting pulses in the nonprinting cycle until their average residual power equals the mandatory average residual power. If the mandatory average residual power equals $\overline{P}_{ac}-\overline{P}_{trans}$, which is greater than $\overline{P}_{uc}$, matrix system 120 only drives unaddressed columns 142 with nonprinting pulses in the nonprinting pulse cycle since this mandatory average residual power is the average residual power of the addressed columns. If the mandatory average residual power equals $\overline{P}_{uc}$, which is greater than $\overline{P}_{ac}-\overline{P}_{trans}$, then the matrix system 120 drives addressed columns 132 with nonprinting pulses in the nonprinting pulse cycle. If the mandatory average power is greater than $\overline{P}_{uc}$ and $\overline{P}_{ac}-\overline{P}_{trans}$, matrix system 120 drives the resistors in addressed columns 132 and unaddressed columns 142 with nonprinting pulses in the nonprinting cycle so that their average residual power equals the mandatory average residual power.

If the printhead temperature should increase or decrease with an increase in the number of addressed resistors, then the mandatory power of an addressed column 132 is either greater than or less than the mandatory power of an unaddressed column 142. Matrix system with a nonprinting pulse cycle 120 drives addressed columns 132 or unaddressed columns 142 with nonprinting pulses, accordingly.

The claims define the invention. The figures and the Detailed Description show some embodiments of the claimed invention. Many other embodiments are possible such as systems that interchanged the rows and columns. However, it is the following claims that define the invention and determine its scope.

What is claimed is:

1. An apparatus, comprising:

a. a printhead having a known efficiency, $\eta$;

b. a matrix located on the printhead, the matrix having:
  i. n rows and m columns of resistors that are either addressed resistors or unaddressed resistors;
  ii. an addressed row that may have one or more addressed resistors;
  iii. an unaddressed row that does not have any addressed resistors;
  iv. an addressed column that has an addressed resistor; and
  v. an unaddressed column that does not have any addressed resistors;

c. an addressed row driver that drives the addressed row with $V_D+V_{Ref}$;

d. an addressed column driver that drives the addressed column with a reference voltage, $V_{Ref}$, and e. a means for driving the unaddressed row and the unaddressed column with voltages having a magnitude that causes the addressed column and the unaddressed column to dissipate the same amount of average residual power so that the temperature of the printhead is constant regardless of the number of addressed resistors.

2. An apparatus as in claim 1, wherein step e, further comprises:

f. an unaddressed row driver that drives the unaddressed row with $AV_D+V_{Ref}$, g. an unaddressed column driver that drives the unaddressed column with $BV_D+V_{Ref}$, h. A has an assigned value; and i. B has the value that solves the equation, $\eta=B[2-Bn+2A(n-1)]$.

3. An apparatus as in claim 2, wherein step h and i are replaced by:

j. B has an assigned value; and k. A has the value that solves the equation, $\eta=B[2-Bn+2A(n-1)]$.

4. An apparatus as in claim 1, wherein step e is replaced by:

f. a means for driving the unaddressed row and the unaddressed column with voltages having a magnitude that causes the addressed column to dissipate an average residual power that is greater or less than the average residual power dissipated by the unaddressed column so that the temperature of the printhead increases or decreases in a prescribed manner with the number of addressed resistors.

5. An apparatus as in claim 4, wherein step f, further comprises:

g. an unaddressed row driver that drives the unaddressed row with $AV_D+V_{Ref}$, h. an unaddressed column driver that drives the unaddressed column with $BV_D+V_{Ref}$, i. A has an assigned value; and j. B has the value that solves the equation, $\eta\pm k=B[2-Bn+2A(n-1)]$ so that the average residual power and temperature of the printhead changes in a prescribe manner with the number of addressed resistors.

6. An apparatus as in claim 5, wherein steps i and j are replaced by:

k. B has an assigned value; and l. A has the value that solves the equation, $\eta\pm k=B[2-Bn+2A(n-1)]$ so that the average residual power and temperature of the printhead changes in a prescribe manner with the number of addressed resistors.

7. An apparatus, as in claim 1, wherein:

f. the printhead has an efficiency, $\eta$, approximately equal to zero;

g. the matrix has four rows and m columns;

h. the means for driving the unaddressed row and the unaddressed column further comprises:
  i. an unaddressed row driver that drives the unaddressed row with $V_{Ref}$, and
  ii. an unaddressed column driver that drives the unaddressed column with $\frac{1}{2}V_D$ so that the addressed column and the unaddressed column dissipate the same amount of total power which equals the total residual power since 100% of the power dissipated by the addressed resistor remains with the printhead when the efficiency equals zero.

8. An apparatus as in claim 1, wherein:

f. the printhead has an efficiency, $\eta$, approximately equal to 100%;

g. the means for driving the unaddressed rows and the unaddressed columns, further comprises:
  i. an unaddressed row driver that drives the unaddressed row with $\frac{1}{2}V_D$; and
  ii. an unaddressed column driver that drives the unaddressed column with $V_D$ so that the total power dissipated by the unaddressed resistors is constant and equals the total residual power of the printhead since the printhead has an efficiency of approximately 100% and nearly all the power generated by the addressed resistor is transferred to the ink drop.

9. A method for measuring the efficiency of a printhead, comprising the steps of:

a. driving an addressed row on the printhead with $V_D+V_{Ref}$, the addressed row is located on the printhead in a matrix, the matrix having:
  i. n rows and m columns of resistors that are either addressed resistors or unaddressed resistors;

ii. one or more addressed resistors in the addressed row;
iii. an unaddressed row that does not have any addressed resistors;
iv. an addressed column that has an addressed resistor, and
v. an unaddressed column that does not have any addressed resistors;
b. driving at least one addressed column with $V_{Ref}$;
c. setting A and B equal to constants such that the magnitudes of $AV_D^2/R$, $(B-A)\ V_D^2/R$, and $(1-B)\ V_D^2/R$ will not cause the unaddressed resistors to eject drops;
d. driving the unaddressed row with $AV_D+V_{Ref}$;
e. driving the unaddressed column with $BV_D+V_{Ref}$;
f. measuring the temperature of the printhead once it reaches thermal equilibrium, this temperature is known as the first thermal equilibrium temperature;
g. converting at least one addressed column into an unaddressed column by driving it with $BV_D+V_{Ref}$ instead of $V_{Ref}$;
h. measuring the temperature of the printhead once it reaches thermal equilibrium again, this temperature is known as the second thermal equilibrium temperature;
i. comparing the first thermal equilibrium temperature and the second thermal equilibrium temperature;
j. repeating steps a through j if the first thermal equilibrium temperature does not equal the second thermal equilibrium temperature; and
k. calculating the efficiency of the printhead from $\eta=B[2-Bn+2A(n-1)]$ with values of A and B that result in the first thermal equilibrium temperature equaling the second thermal equilibrium temperature.

10. A method, comprising the steps:
a. measuring the efficiency, $\eta$, of a printhead having a matrix, the matrix having:
i. n rows and m columns of resistors that are either addressed resistors or unaddressed resistors;
ii. an addressed row that may have one or more addressed resistors;
iii. an unaddressed row that does not have any addressed resistors;
iv. an addressed column that has an addressed resistor; and
v. an unaddressed column that does not have any addressed resistors;
b. driving the addressed row with $V_D+V_{Ref}$;
c. driving the addressed column with $V_{Ref}$;
d. driving the unaddressed row with $AV_D+V_{Ref}$;
e. driving the unaddressed column with $BV_D+V_{Ref}$; and
f. maintaining the average residual power of the addressed columns equal to the average residual power of the unaddressed columns so that the average residual power and the temperature of the printhead are constant.

11. A method, as in claim 10, wherein step f further comprises:
g. assigning a value to A; and
h. solving $\eta=B[2-Bn+2A(n-1)]$ to find that value of B that results in the addressed columns and the unaddressed columns dissipating the same amount of average residual power.

12. A method, as in claim 10, wherein step f further comprises:
g. assigning a value to B; and
h. solving $\eta=B[2-Bn+2A(n-1)]$ to find that value of A that results in the addressed columns and the unaddressed columns dissipating the same amount of average residual power.

13. A method, as in claim 10, wherein step f is replaced by:
g. maintaining the average residual power of the addressed columns equal to the average residual power of the unaddressed columns plus or minus $P_k$, a constant amount of power that equals $kV_D^2/R$, so that the average residual power and the temperature of the printhead varies in a prescribed manner with the number of addressed resistors.

14. A method, as in claim 13, wherein step g further comprises:
h. assigning a value to A; and
i. solving $\eta\pm k=B[2-Bn+2A(n-1)]$ to find that value of B that results in the average residual power of the printhead varying in a prescribed manner with the number of addressed resistors so that the temperature of the printhead varies in a prescribed manner with the number of addressed resistors.

15. A method, as in claim 13, wherein step g further comprises:
h. assigning a value to B; and
i. solving $\eta\pm k=B[2-Bn+2A(n-1)]$ to find that value of A that results in the average residual power of the printhead varying in a prescribed manner with the number of addressed resistors so that the temperature of the printhead varies in a prescribed manner with the number of addressed resistors.

* * * * *